Nov. 9, 1926. 1,606,675
G. TASMAN
WINDOW FOR AUTOMOBILES
Filed Jan. 4, 1926 2 Sheets-Sheet 2

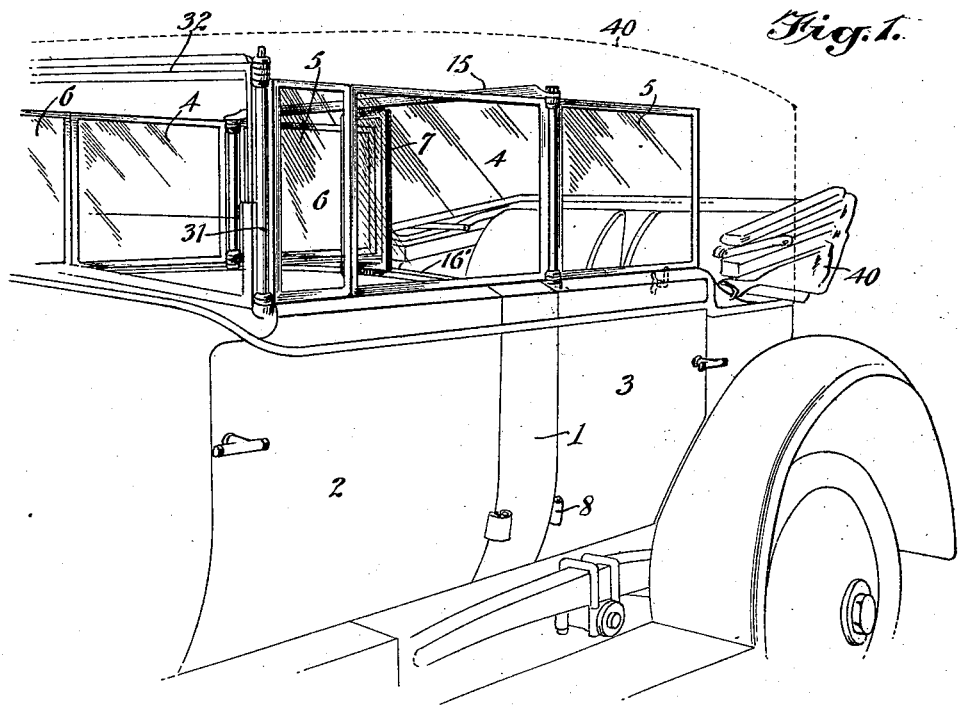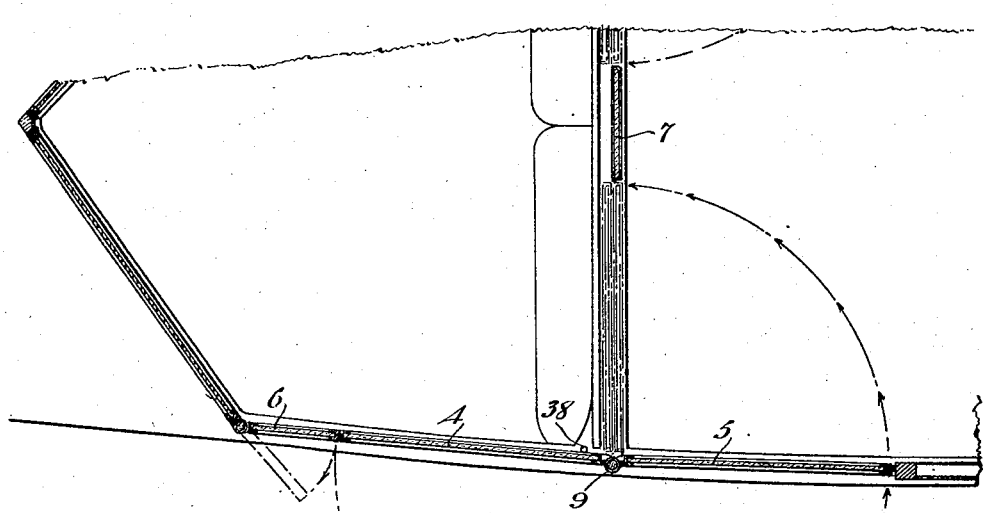

WITNESSES

INVENTOR
George Tasman
BY
ATTORNEYS

Patented Nov. 9, 1926.

1,606,675

UNITED STATES PATENT OFFICE.

GEORGE TASMAN, OF BROOKLYN, NEW YORK, ASSIGNOR TO LOCKE & CO., OF NEW YORK, N. Y., A CORPORATION OF NEW YORK.

WINDOW FOR AUTOMOBILES.

Application filed January 4, 1926. Serial No. 79,207.

This invention relates to windows for automobiles, an object of the invention being to provide an improved arrangement of windows which are capable of movement so as to permit the occupants of the car to arrange the windows in various ways to suit conditions.

A further object is to provide an automobile with an arrangement of windows which enables the rear portion of the car to be entirely enclosed so as to form in effect a limousine, or arrange the windows so as to form in effect a sedan, or to permit various other arrangements of the windows as may be desired.

With these and other objects in view, the invention consists in certain novel features of construction and combinations and arrangements of parts, which will be more fully hereinafter described and pointed out in the claims.

In the accompanying drawings—

Figure 1 is a perspective view, showing an automobile equipped with my improved arrangement of windows;

Figure 2 is an exaggerated view in horizontal section, showing one set of windows;

Figure 4:
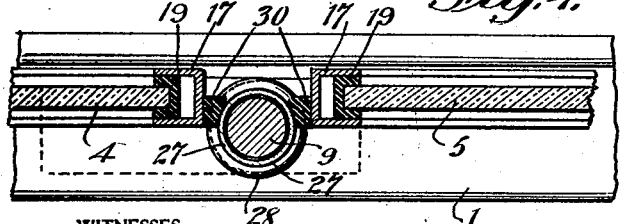
Figure 4 is a view in section on the line 4—4 of Figure 3.

1 represents an automobile body having front and rear doors 2 and 3 and a cover or top 40 which may be of the folding type. This cover is illustrated in folded position in Figure 4 and in open or covering position in the same figure by dotted lines.

My invention has to do with the arrangement of windows and I provide at each side of the body 1 a pair of hinged windows 4 and 5 which co-operate with wind or deflecting panels 6 and a stationary panel 7 intermediate the sides of the car body so as to enable any desired arrangement of said windows.

The construction of the windows and the wind deflecting panels at both sides of the car body are precisely alike, and hence the description hereinafter of one set of such windows and panels will apply alike to both.

On the upper edge of the automobile body 1 at a point substantially in alinement with the hinge or hinges 8 of the rear door 3 a vertical post 9 is rigidly fixed to a plate 10 and the latter secured to the automobile body by screws 11 or other securing means. This post 9 preferably has a head 12 at its lower end to provide a sufficient surface for welding or otherwise securing the same to the plate 10.

The post 9 at its upper end is reduced in diameter so as to provide a screw-threaded stud 13, an annular shoulder 14 being thereby formed at the juncture of the stud 13 and the larger diameter of post 9. A bar 15 is positioned transversely of the automobile and has perforated ends receiving the studs 13 and secured thereon by cap nuts 16 so that the posts are rigidly compressed by this bar 15, and, furthermore, the panel 7 above referred to is secured to this bar and to a cross support 16' of the automobile body and is located intermediate the side walls of the body.

Figure 6:
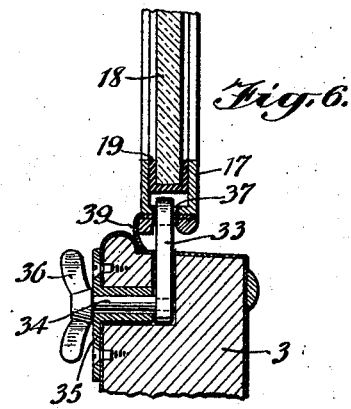
Figure 6 is a view in section on the line 6—6 of Figure 5.

The windows 4 and 5 have channel iron frames 17, the glass panes 18, constituting the main portions of the windows, being secured in such panel frames and held against rattling by a strip of rubber or other channels 19, rigidly holding the panes in the frames 17; and it will be noted particularly by reference to Figure 6 that a small space is allowed or formed in the lower portions of the windows between the bottoms of the channels 17 and the channels 19.

Perforated hinge members 20 and 21 receive the lower portion of post 9, are mounted thereon, and have angular extensions 22 located within and secured within the channel frames 17. These angular members 22 are positioned in both the lower and vertical portions of the channel frames and are rigidly secured in place. Similar hinge members 23 and 24 are mounted on the reduced stud 13 at the upper ends of the posts 9 and have members 25 and 26 respectively projecting into and secured in the upper portions of the window frames.

A vertical spacing sleeve 27 is located around the post 9 and has enlarged ends 28 engaging hinge member 20 at its lower end and hinge member 24 at its upper end. Gaskets 29 are located between the upper pair of hinge members 23 and 24, between the lower pair of hinge members 20 and 21, and between the lower hinge member 21 and the head or enlargement 12 at the lower end of post 9. It will thus be noted that when the cap nut 16 is screwed on it will tightly compress the movable parts against the gaskets which will insure a sufficient frictional resistance to the hinge movement of the windows and will insure a strong and rigid construction.

Strips 30, preferably of rubber, are secured to the window frames 4 and 5 and engage the outer surface of the sleeve 27 so as to make the space between said parts weatherproof and also to frictionally engage the sleeve 27.

The wind deflectors 6 at both sides of the automobile body are hingedly connected to uprights or posts 31 which support the windshield frame 32, and are also mounted in any suitable manner so as to insure their remaining in any position to which they are moved.

It will be noted that the combined length of window 4 and deflector 6 is sufficient to close the space between the posts 9 and the posts or uprights 31 so as to enclose the chauffeur and other occupant in the front seat when the window and deflector are in alinement, as shown in Figure 1.

Also it will be noted that the window 5 is of such size as to entirely close the space above the door 3 when in vertical alinement therewith.

Figure 3:
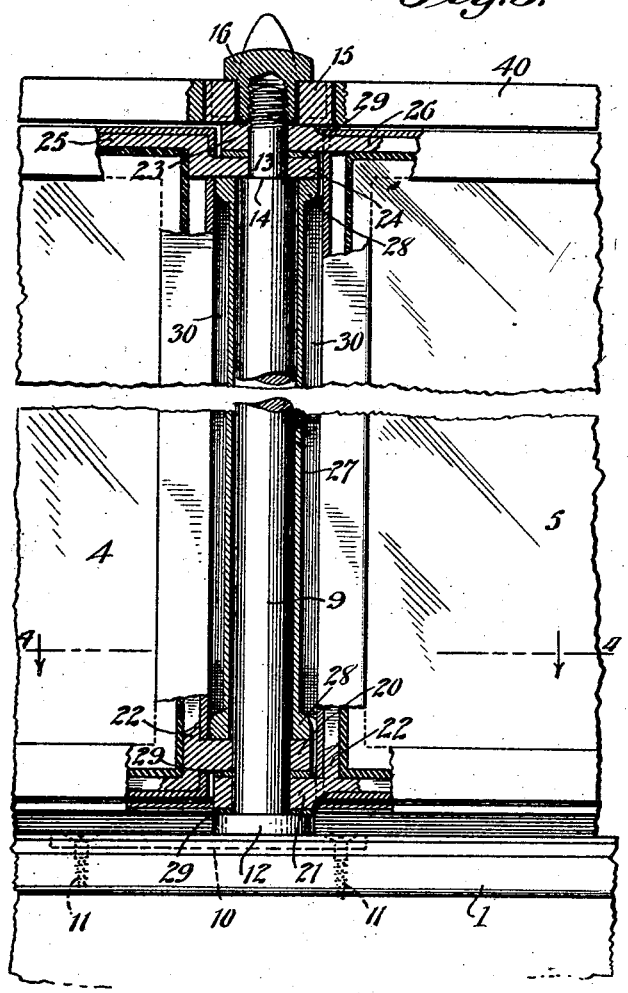
Figure 3 is a view in longitudinal section on an enlarged scale, showing the hinges of a pair of windows.
Figure 5:
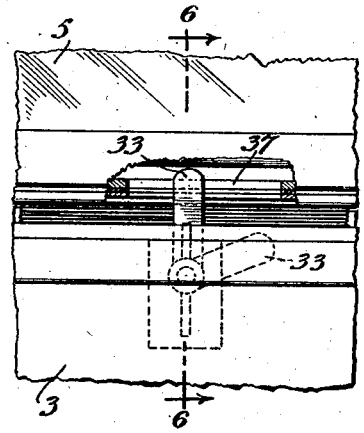
Figure 5 is a fragmentary view, partly broken away, illustrating the manner of coupling one of the windows to one of the rear portions of the automobile.

To insure the opening of the window 5 with the door 3 I provide a catch arm 33 fixed to a shaft 34 mounted in a bearing bracket 35 in the door, and having a crank handle 36 at its inner end. This catch arm 33 may be swung upwardly through a slot 37 in the bottom of the window frame and hold the frame and door together so as to compel their movement together. As the door may not be mounted exactly concentric with the hinge mounting of the window it is desirable that this slot 37 be of such length as to compensate for the different arcs in which the members move, as clearly shown in Figure 5.

Attention is particularly directed to Figure 2 of the drawing which shows the different positions the several parts may assume in accordance with the will of the operator. As indicated in full lines, the windows and deflectors are in alinement so as to form a complete enclosure for the body. The window 5 can be swung inwardly and the window 4 brought around above the door 3 so that the rear portion of the body may be completely enclosed in limousine form. Both windows 4 and 5 may be swung to the dotted line position shown in Figure 2, leaving the sides of the car open.

Flexible weather strips 39 are preferably secured to the edges of the windows to engage parts of the automobile body and render the same weatherproof, as indicated most clearly in Figure 6.

Fixed pins 38 may be provided on the upper edge of the body 1 to limit the inward movement of the windows 4, and various other additions, modifications and changes may be made in the form and construction of my improved windows and their mounting without departing from my invention, and hence I do not limit myself to the precise details set forth but consider myself at liberty to make such slight changes and alterations as fairly fall within the spirit and scope of the appended claims.

I claim:—

1. In combination with an automobile body, a pair of posts fixed to the sides of the body intermediate the ends thereof, a bar fixed to the tops of the posts and extending transversely of the body, a fixed panel secured to said bar and to a fixed part of the car intermediate the sides thereof, a pair of windows hinged to each post, hingedly mounted wind deflectors at the front of the car, and said windows, panel and deflectors co-operating to enclose or partially enclose the body of the car.

2. In combination with an automobile body, a pair of posts fixed to the sides of the body intermediate the ends thereof, a bar fixed to the tops of the posts and extending transversely of the body, a fixed panel secured to said bar and to a fixed part of the car intermediate the sides thereof, a pair of windows hinged to each post, hingedly mounted wind deflectors at the front of the car, and said windows, panel and deflectors co-operating to enclose or partially enclose the body of the car, one pair of said windows located above the doors of the body, and devices carried by the said doors to couple the windows thereto.

GEORGE TASMAN.